United States Patent
Kang et al.

(10) Patent No.: US 10,871,866 B2
(45) Date of Patent: *Dec. 22, 2020

(54) TOUCH SENSOR AND DISPLAY INCLUDING THE SAME

(71) Applicant: Samsung Display Co., Ltd., Yongin (KR)

(72) Inventors: Sung Ku Kang, Suwon-si (KR); Joo-Han Bae, Seongnam-si (KR); Byeong-Jin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 138 days.

This patent is subject to a terminal disclaimer.

(21) Appl. No.: 15/847,810

(22) Filed: Dec. 19, 2017

(65) Prior Publication Data

US 2018/0113535 A1    Apr. 26, 2018

Related U.S. Application Data

(63) Continuation of application No. 14/673,020, filed on Mar. 30, 2015, now Pat. No. 9,880,681.

(30) Foreign Application Priority Data

Oct. 10, 2014 (KR) .......... 10-2014-0136986

(51) Int. Cl.
   *G06F 3/044*   (2006.01)
   *G06F 3/041*   (2006.01)

(52) U.S. Cl.
   CPC .......... *G06F 3/0443* (2019.05); *G06F 3/0412* (2013.01); *G06F 3/0448* (2019.05); *G06F 2203/04112* (2013.01)

(58) Field of Classification Search
   CPC .......... G06F 3/044; G06F 2203/04111; G06F 2203/0411
   See application file for complete search history.

(56) References Cited

U.S. PATENT DOCUMENTS 8,493,349 B2 *  7/2013  Hwang .................. G06F 3/044
                                            345/173
8,698,768 B2    4/2014  Lee et al.
(Continued)

FOREIGN PATENT DOCUMENTS

JP    2012-094147    5/2012
KR   10-2010-0006987  1/2010
(Continued)

OTHER PUBLICATIONS

Non Final Office Action dated Jul. 21, 2016, in U.S. Appl. No. 14/673,020.
(Continued)

*Primary Examiner* — Patrick F Marinelli
(74) *Attorney, Agent, or Firm* — H.C. Park & Associates, PLC

(57) ABSTRACT

A touch sensor is disclosed to include a first mesh touch electrode formed in a first direction and transmitting a first touch signal, a first supplementary mesh touch electrode formed on the same layer as the first mesh touch electrode, an insulating layer covering the first mesh touch electrode and the first supplementary mesh touch electrode and having a contact cutout, a second mesh touch electrode formed in a second direction crossing the first direction and transmitting a second touch signal, and a second supplementary mesh touch electrode formed on the same layer as the second mesh touch electrode. In this touch sensor, the first mesh touch electrode is connected to the second supplementary mesh touch electrode through the contact cutout and the second
(Continued)

mesh touch electrode is connected to the first supplementary mesh touch electrode through the contact cutout.

11 Claims, 10 Drawing Sheets

(56) References Cited

U.S. PATENT DOCUMENTS

| | | | |
|---|---|---|---|
| 8,963,848 B2* | 2/2015 | Choi | G06F 3/044 |
| | | | 345/173 |
| 9,018,535 B2* | 4/2015 | Zeng | H01H 11/00 |
| | | | 174/254 |
| 9,078,364 B2* | 7/2015 | Nakamura | B32B 15/14 |
| 9,280,242 B2* | 3/2016 | Choung | G06F 3/044 |
| 9,281,347 B2* | 3/2016 | Choi | H01L 27/323 |
| 2009/0085885 A1* | 4/2009 | Wu | G06F 3/041 |
| | | | 345/173 |
| 2010/0045625 A1* | 2/2010 | Yang | G06F 3/044 |
| | | | 345/173 |
| 2010/0110023 A1* | 5/2010 | Chien | G02B 5/201 |
| | | | 345/173 |
| 2011/0128240 A1* | 6/2011 | Choi | G02F 1/13 |
| | | | 345/173 |
| 2011/0141037 A1* | 6/2011 | Hwang | G06F 3/044 |
| | | | 345/173 |
| 2012/0026099 A1* | 2/2012 | Harley | G06F 3/044 |
| | | | 345/173 |
| 2012/0113042 A1* | 5/2012 | Bayramoglu | G06F 3/044 |
| | | | 345/174 |
| 2012/0318585 A1* | 12/2012 | Kim | H05K 3/06 |
| | | | 178/18.03 |
| 2013/0135224 A1* | 5/2013 | Lee | G06F 3/044 |
| | | | 345/173 |
| 2013/0188103 A1* | 7/2013 | Jeng | G06F 3/041 |
| | | | 349/12 |
| 2013/0256008 A1* | 10/2013 | Zeng | H01H 11/00 |
| | | | 174/257 |
| 2013/0341651 A1* | 12/2013 | Kim | H01L 31/0232 |
| | | | 257/84 |
| 2014/0117330 A1* | 5/2014 | Cho | H01L 51/5256 |
| | | | 257/40 |
| 2014/0152917 A1* | 6/2014 | Lee | G06F 3/044 |
| | | | 349/12 |
| 2014/0238730 A1* | 8/2014 | Nakamura | B32B 15/14 |
| | | | 174/253 |
| 2014/0313434 A1* | 10/2014 | Kim | G02F 1/13338 |
| | | | 349/12 |
| 2014/0333855 A1* | 11/2014 | Park | G06F 3/041 |
| | | | 349/12 |
| 2015/0015532 A1* | 1/2015 | Choung | G06F 3/044 |
| | | | 345/174 |
| 2015/0015806 A1* | 1/2015 | Wu | G06F 3/044 |
| | | | 349/12 |
| 2015/0115254 A1* | 4/2015 | Choi | H01L 27/323 |
| | | | 257/40 |
| 2015/0185892 A1* | 7/2015 | Chae | G06F 3/041 |
| | | | 345/173 |
| 2015/0185917 A1* | 7/2015 | Song | G06F 3/044 |
| | | | 345/174 |
| 2015/0205413 A1* | 7/2015 | Zeng | H01H 11/00 |
| | | | 29/622 |
| 2015/0261370 A1* | 9/2015 | Yoo | G06F 3/0412 |
| | | | 345/173 |
| 2015/0324047 A1* | 11/2015 | Kim | G06F 3/0412 |
| | | | 345/173 |
| 2015/0346866 A1* | 12/2015 | Kusunoki | G06F 3/044 |
| | | | 345/174 |
| 2015/0363024 A1* | 12/2015 | Hayashi | G06F 3/044 |
| | | | 345/174 |
| 2015/0370375 A1* | 12/2015 | Hayashi | G06F 3/044 |
| | | | 345/174 |
| 2016/0041647 A1* | 2/2016 | Bae | G06F 3/044 |
| | | | 345/174 |
| 2016/0048248 A1* | 2/2016 | Na | G06F 3/044 |
| | | | 345/174 |
| 2016/0048255 A1* | 2/2016 | Jeng | G06F 3/041 |
| | | | 345/173 |
| 2016/0054609 A1* | 2/2016 | Kim | G06F 3/0412 |
| | | | 438/24 |
| 2016/0062529 A1* | 3/2016 | Jeng | G06F 3/041 |
| | | | 345/173 |
| 2016/0103516 A1* | 4/2016 | An | H01L 51/5256 |
| | | | 345/174 |
| 2016/0103517 A1* | 4/2016 | Kang | G06F 3/044 |
| | | | 345/174 |

FOREIGN PATENT DOCUMENTS

| | | |
|---|---|---|
| KR | 10-1073333 | 10/2011 |
| KR | 10-2012-0138887 | 12/2012 |
| KR | 10-1226334 | 1/2013 |
| KR | 10-2013-0074933 | 7/2013 |
| KR | 10-1322333 | 10/2013 |
| KR | 10-2014-0010980 | 1/2014 |

OTHER PUBLICATIONS

Final Office Action dated Nov. 3, 2016, in U.S. Appl. No. 14/673,020.
Non Final Office Action dated May 19, 2017, in U.S. Appl. No. 14/673,020.
Notice of Allowance dated Sep. 14, 2017, in U.S. Appl. No. 14/673,020.
Office Action dated Sep. 28, 2020 for Korean Patent Application No. 10-2014-0136986.

* cited by examiner

TOUCH SENSOR AND DISPLAY INCLUDING THE SAME

CROSS-REFERENCE TO RELATED APPLICATION

This application is a Continuation of U.S. patent application Ser. No. 14/673,020, filed on Mar. 30, 2015, and claims priority from and the benefit of Korean Patent Application No. 10-2014-0136986, filed on Oct. 10, 2014, each of which is hereby incorporated by reference for all purposes as if fully set forth herein.

BACKGROUND

Field

Exemplary embodiments relate to a touch sensor and a display device including the same.

Discussion of the Background

For use of an input device as a display device such as a liquid crystal display and an organic light emitting device, a touch sensor transmitting information while in direct contact with a screen by a user's finger or a pen-like device is generally required, the touch sensor commonly using a capacitive type sensing of position where a capacitance change is generated according to the contact between two electrodes which are normally separated from each other.

A thin display device is required to realize a flexible or foldable display, and for this, the touch electrode of the touch sensor and electrodes of the display device (e.g., a cathode of the organic light emitting device) may be arranged in such proximity to increase parasitic capacitance. Particularly in a capacitance type touch sensor, the device will be difficult to operate if parasitic capacitance is increased.

By forming the touch electrode into a mesh shape to address the parasitic capacitance issue, an area of the touch electrode facing the cathode may be minimized such that the parasitic capacitance and linear resistance of the touch electrode may be minimized. This touch electrode includes a plurality of Rx touch electrodes connected in a vertical direction and a plurality of Tx touch electrodes connected in a horizontal direction through a connection line where the inner portion of each of the Rx touch electrode and the Tx touch electrode is formed with the mesh shape. However, the Rx touch electrode and the Tx touch electrode are formed with different layers separated by an insulating layer, resulting in a weak electric field when operated, thereby reducing sensitivity.

The above information disclosed in this Background section is only for enhancement of understanding of the background of the disclosure and therefore it may contain information that does not form the prior art that is already known in this country to a person of ordinary skill in the art.

SUMMARY

The present disclosure provides a touch sensor with improved touch sensitivity while simultaneously minimizing parasitic capacitance and linear resistance, and a display device including the same.

Exemplary embodiments provide a touch sensor that has a first mesh touch electrode formed in a first direction and transmitting a first touch signal, a first supplementary mesh touch electrode formed at the same layer as the first mesh touch electrode, an insulating layer covering the first mesh touch electrode and the first supplementary mesh touch electrode and having a contact cutout, a second mesh touch electrode formed in a second direction crossing the first direction and transmitting a second touch signal, and a second supplementary mesh touch electrode formed at the same layer as the second mesh touch electrode. In the exemplary embodiment, the first mesh touch electrode is connected to the second supplementary mesh touch electrode through the contact cutout and the second mesh touch electrode is connected to the first supplementary mesh touch electrode through the contact cutout.

Exemplary embodiments provide a display device comprising a display panel displaying an image, and a touch sensor formed on the display panel. The touch sensor includes a first mesh touch electrode formed in a first direction and transmitting a first touch signal, a first supplementary mesh touch electrode formed at the same layer as the first mesh touch electrode, an insulating layer covering the first mesh touch electrode and the first supplementary mesh touch electrode and having a contact cutout, a second mesh touch electrode formed in a second direction crossing the first direction and transmitting a second touch signal, and a second supplementary mesh touch electrode formed at the same layer as the second mesh touch electrode. And in the touch sensor, the first mesh touch electrode is connected to the second supplementary mesh touch electrode through the contact cutout and the second mesh touch electrode is connected to the first supplementary mesh touch electrode through the contact cutout.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
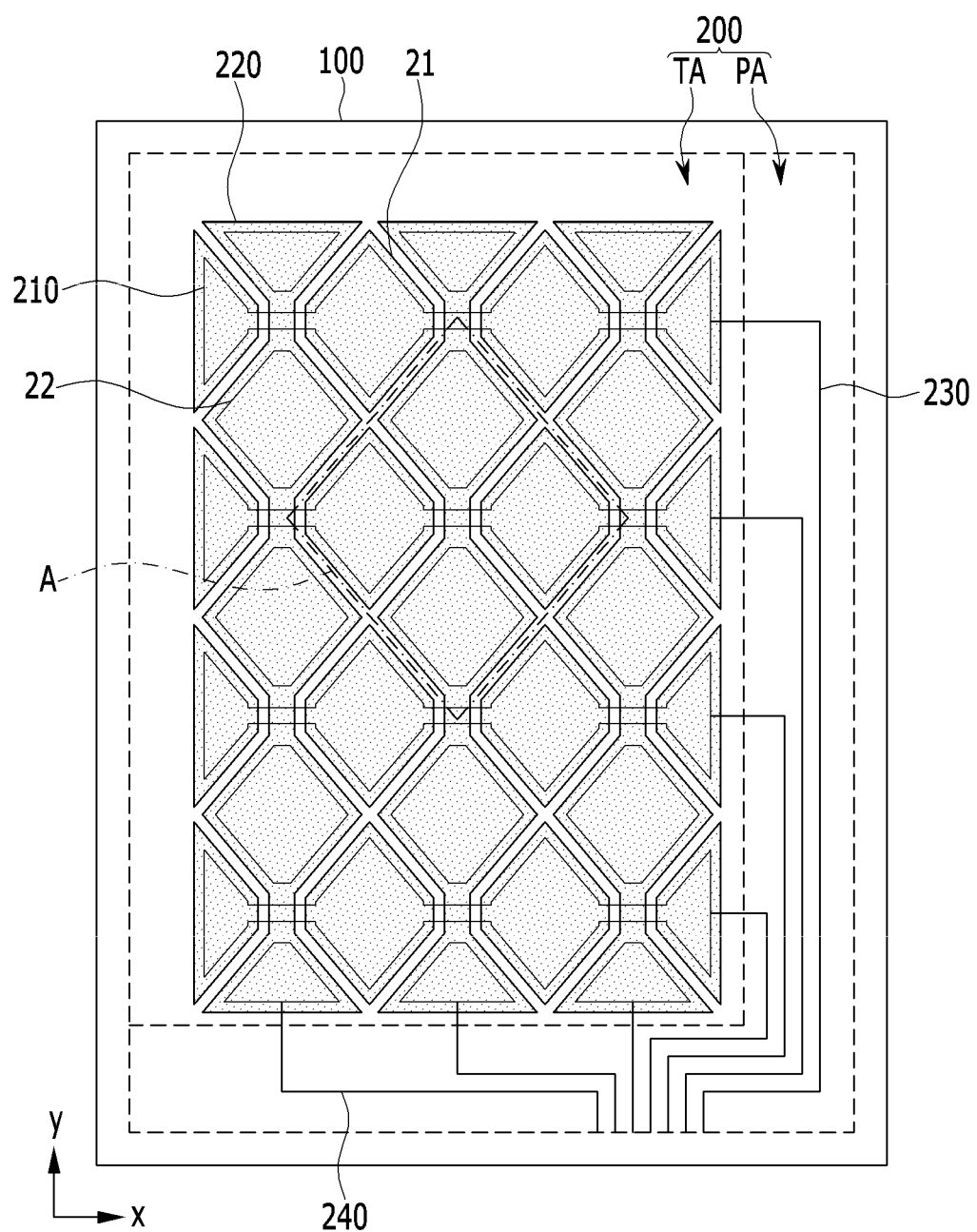
FIG. 1 is a schematic top plan view of a touch sensor according to an exemplary embodiment of the present disclosure and a display device including the same.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Now, a touch sensor according to an exemplary embodiment of the present disclosure will be described with reference to FIG. 1 to FIG. 3.

FIG. 1 is a schematic top plan view of a touch sensor according to an exemplary embodiment of the present disclosure and a display device including the same.

As shown in FIG. 1, a display device according to an exemplary embodiment of the present disclosure includes a display panel 100 capable of displaying an image and a touch sensor 200 formed on the display panel.

The display panel 100 includes a substrate 110 including a transistor, an emission unit R, G, and B formed on the substrate 110 and connected to the transistor, and a covering plate 120 covering the emission unit R, G, and B and the substrate 110. This display panel 100 may be any type of display panel, such as a liquid crystal display panel, an organic light emitting display panel, a plasma display panel, an electrophoretic display panel, an electro-wetting display panel, and so on.

The touch sensor 200 includes a first mesh touch electrode 210 formed on the covering plate 120 and formed along a first direction (x) of a horizontal direction and a second mesh touch electrode 220 formed along a vertical direction of a second direction (y) crossing the first direction (x). A first driving circuit wiring 230 connected to the first mesh touch electrode 210 and second driving circuit wiring 240 connected to the second mesh touch electrode 220 are also included. The first mesh touch electrode 210 and the second mesh touch electrode 220 are formed at the touch region TA, and the first driving circuit wiring 230 and the second driving circuit wiring 240 are formed at a peripheral area PA enclosing the touch region TA.

The first mesh touch electrode 210 includes electrode patterns having an approximate rhomboid shape and connected to each other along the first direction (x), and corresponds to a Tx touch electrode (Transmitter touch electrode) transmitting a first touch signal corresponding to a Y-axis coordinate value. The second mesh touch electrode 220 includes electrode patterns having an approximate rhomboid shape and connected to each other along the second direction (y), and corresponds to an Rx touch electrode (Receiver touch electrode) transmitting a first touch signal corresponding to an X-axis coordinate value. In the present exemplary embodiment, the first mesh touch electrode 210 and the second mesh touch electrode 220 are formed in a rhomboid shape, but they are not limited thereto, and they may be formed of various shapes.

The first mesh touch electrode 210 and the second mesh touch electrode 220 sense the coordinate values by the touch of the user and respectively transmit them to an external driving circuit (not shown) through the first driving circuit wiring 230 and the second driving circuit wiring 240 after being converted into an electric signal. In this case, since the shape of the first mesh touch electrode 210 and the second mesh touch electrode 220 have the mesh shape, the area facing the electrode formed in the display panel, the cathode, for example, may be minimized, thereby minimizing the parasitic capacitance.

A second supplementary mesh touch electrode 21 is positioned on the first mesh touch electrode 210 such that the first mesh touch electrode 210 and the second supplementary mesh touch electrode 21 are overlapped, and a first supplementary mesh touch electrode 22 is positioned under the second mesh touch electrode 220 such that the second mesh touch electrode 220 and the first supplementary mesh touch electrode 22 are overlapped. In this case, the first mesh touch electrode 210 and the second supplementary mesh touch electrode 21 are connected and the second mesh touch electrode 220 and the first supplementary mesh touch electrode 22 are respectively connected through contact cutouts 251 and 252 (referring to FIG. 2 and FIG. 3) such that cross-sectional transmitting of the first touch signal and the second touch signal may be increased, thereby minimizing the linear resistance of the first mesh touch electrode 210 and the second mesh touch electrode 220.

Next, a detailed structure of the touch sensor shown in FIG. 1 and a display device including the same will be described with reference to FIG. 2 and FIG. 3.

Figure 2:
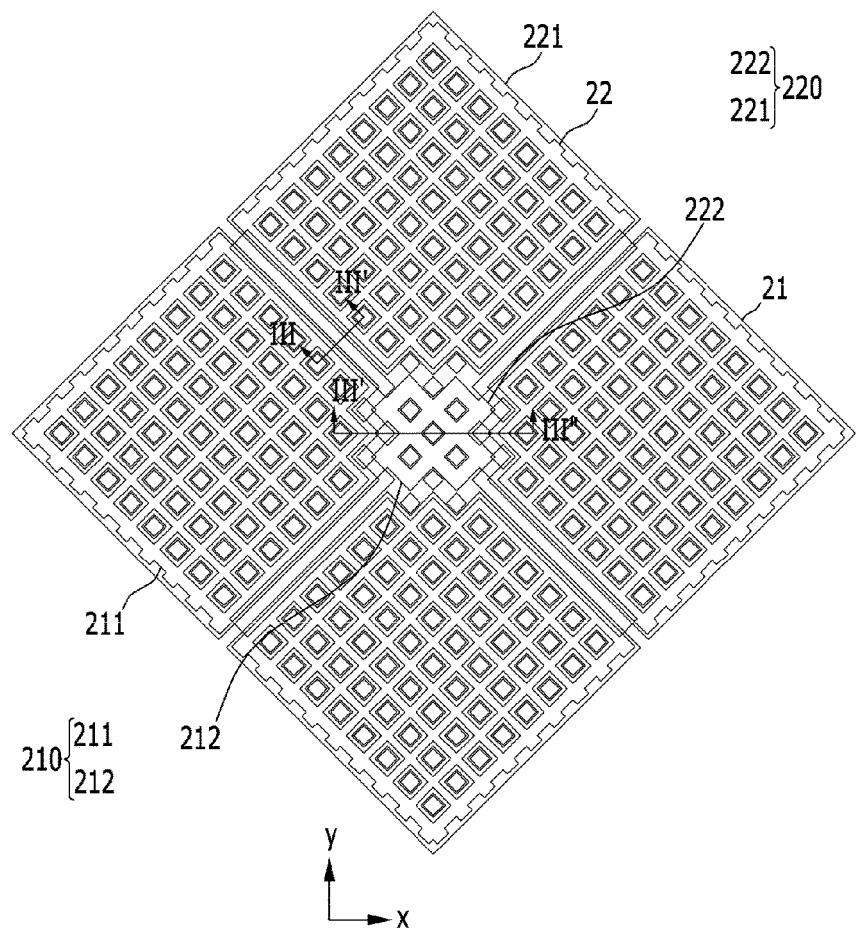
FIG. 2 is an enlarged layout view showing a portion A of FIG. 1.
Figure 4:
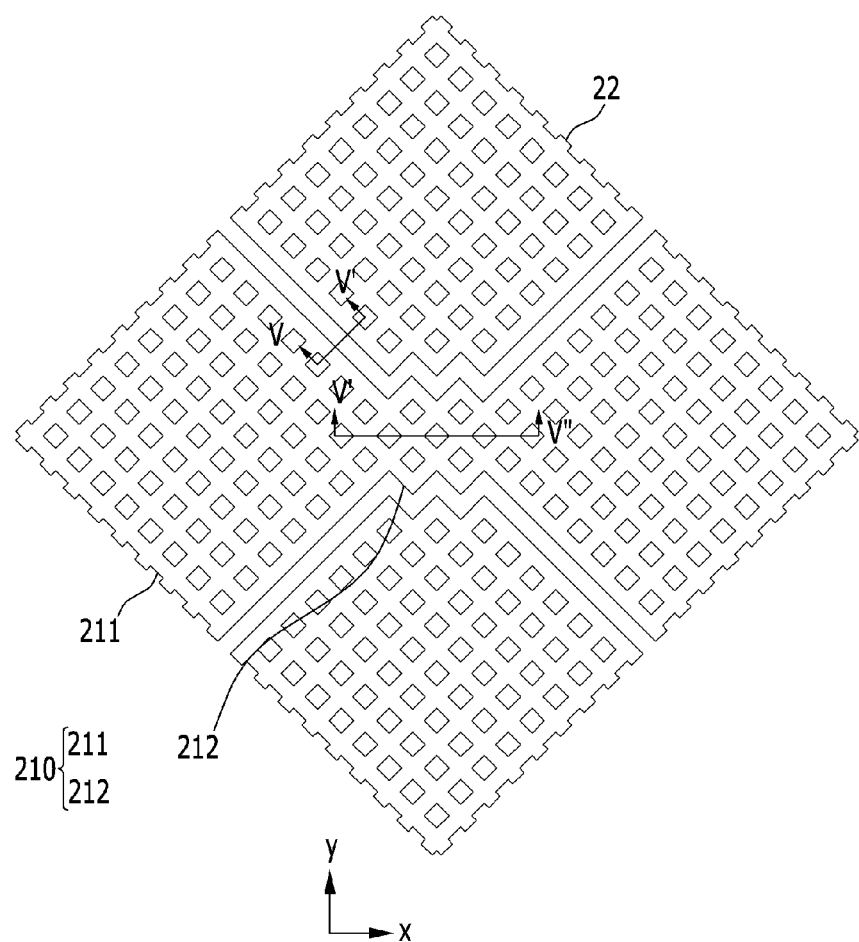
FIG. 4 is a layout view only showing the first mesh touch electrode and the first supplementary mesh touch electrode in FIG. 2.
Figure 5:
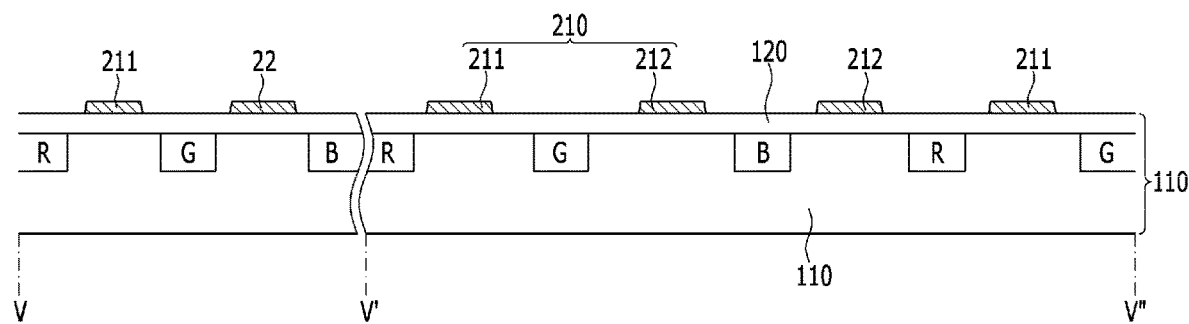
FIG. 5 is a cross-sectional view taken along lines V-V' and V'-V" of FIG. 4.
Figure 6:
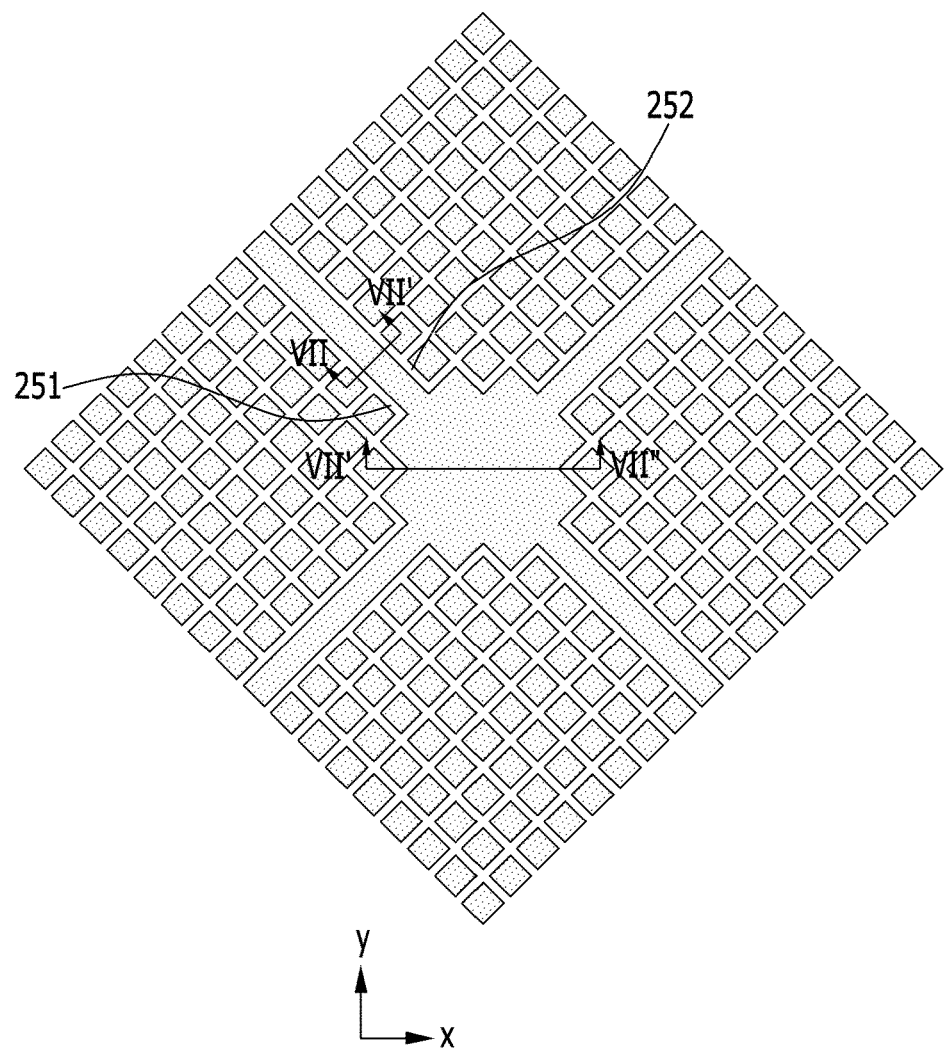
FIG. 6 is a layout view only showing an insulating layer formed with a contact cutout in FIG. 2.
Figure 7:
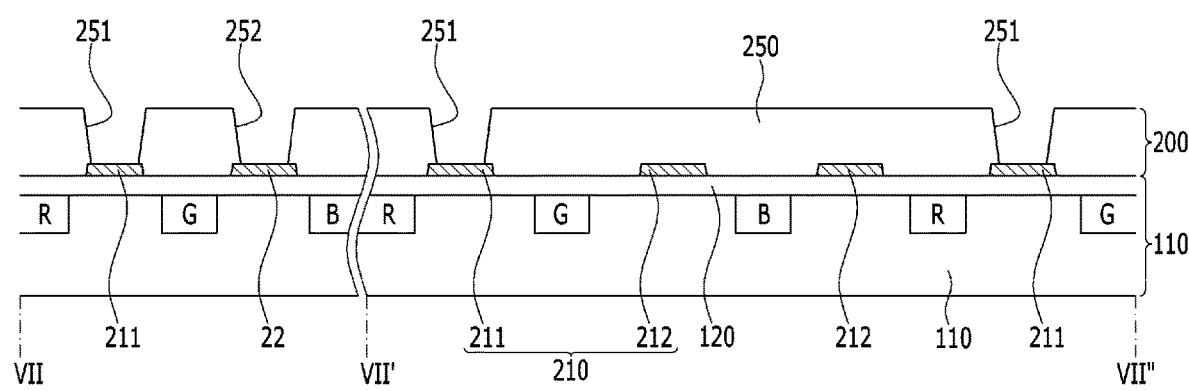
FIG. 7 is a cross-sectional view taken along lines VII-VII' and VII'-VII" of FIG. 6.

FIG. 2 is an enlarged layout view showing a portion A of FIG. 1. FIG. 3 is a cross-sectional view of the touch sensor and the display device including the same of FIG. 2 taken along lines III-III' and III'-III''. FIG. 4 is a layout view only showing the first mesh touch electrode and the first supplementary mesh touch electrode in FIG. 2. FIG. 5 is a cross-sectional view taken along lines V-V' and V'-V'' of FIG. 4. FIG. 6 is a layout view only showing an insulating layer formed with a contact cutout in FIG. 2. FIG. 7 is a cross-sectional view taken along lines VII-VII' and VII'-VII'' of FIG. 6. and FIG. 8 a layout view only showing the second mesh touch electrode and the second supplementary mesh touch electrode in FIG. 2.

As shown in FIG. 2 to FIG. 5, in the display device according to an exemplary embodiment of the present disclosure, the first mesh touch electrode 210 and the first supplementary mesh touch electrode 22 are formed on the display panel 100. The first mesh touch electrode 210 and the first supplementary mesh touch electrode 22 may be formed of a low resistance material such as indium tin oxide (ITO), carbon nanotubes (CNT), graphene, Al, Cu, Cr, Ni, and other such material, or combination thereof.

The first mesh touch electrode 210 includes a first main touch unit 211 of the approximate rhomboid shape and a first connection 212 connecting the first main touch unit 211. The first mesh touch electrode 210 is elongated along the first direction (x). The first supplementary mesh touch electrode 22 is formed to be separated from the first mesh touch electrode 210.

As shown in FIG. 2, FIG. 3, FIG. 6, and FIG. 7, an insulating layer 250 covering the first mesh touch electrode 210 and the first supplementary mesh touch electrode 22 is formed thereon. The insulating layer 250 may be formed of a silicon oxide or silicon nitride. The insulating layer 250 has contact cutouts 251 and 252 respectively exposing the first mesh touch electrode 210 and the first supplementary mesh touch electrode 22. These contact cutouts 251 and 252 include a plurality of linear cutouts connected to each other thereby forming the mesh shape, and are positioned corresponding to the first main touch unit 211 and the first supplementary mesh touch electrode 22.

Figure 3:
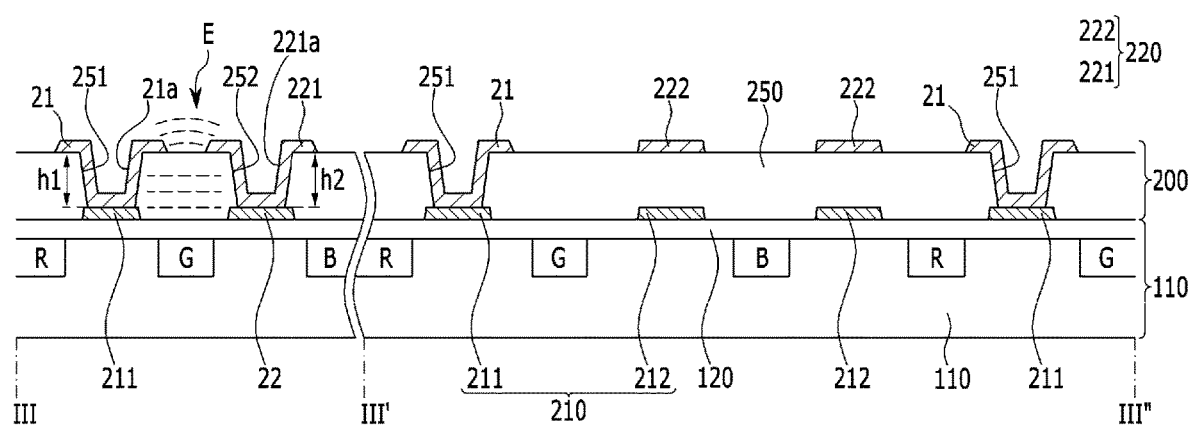
FIG. 3 is a cross-sectional view of the touch sensor and the display device including the same of FIG. 2 taken along lines III-III' and III'-III".
Figure 8:
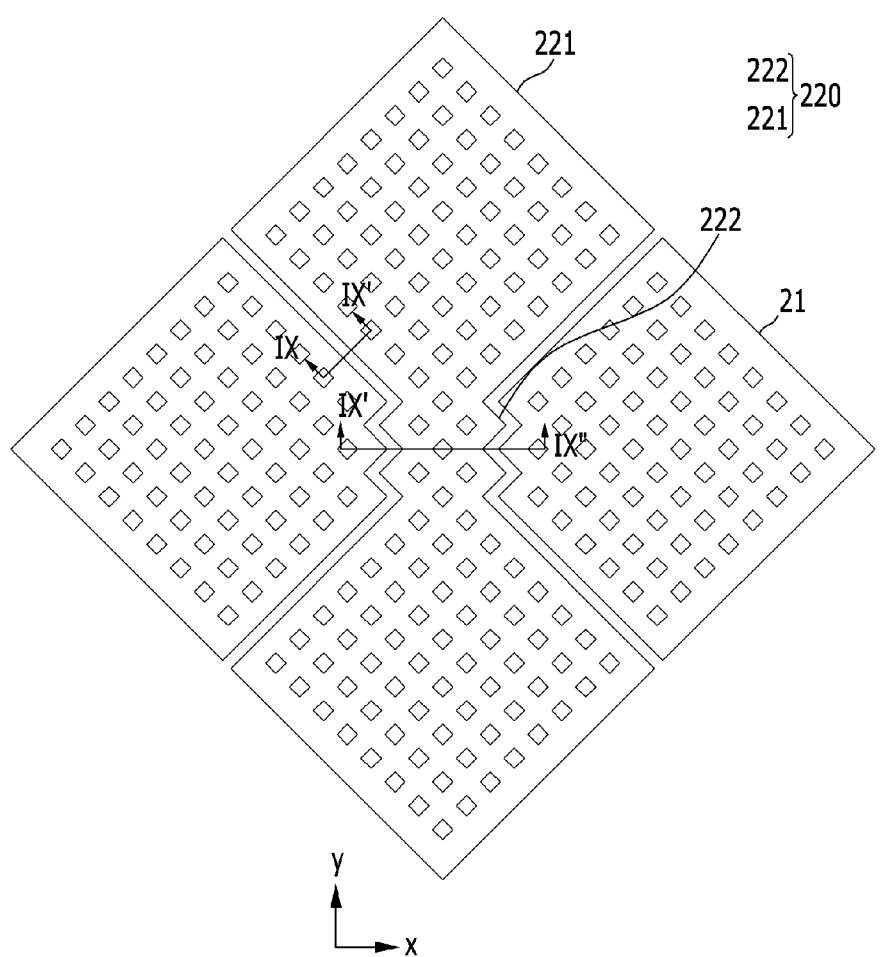
FIG. 8 a layout view only showing the second mesh touch electrode and the second supplementary mesh touch electrode in FIG. 2.

As shown in FIG. 2, FIG. 3, and FIG. 8, the second mesh touch electrode 220 and the second supplementary mesh touch electrode 21 are formed on the insulating layer 250. The second mesh touch electrode 220 and the second supplementary mesh touch electrode 21 may be formed of the low resistance material such as indium tin oxide (ITO), carbon nanotubes (CNT), graphene, Al, Cu, Cr, Ni, and other such material, or combination thereof.

The second mesh touch electrode 220 includes a second main touch unit 221 of the approximate rhombus shape and a second connection 222 connecting the second main touch unit 221. The second mesh touch electrode 220 is elongated along the second direction (y). The second supplementary mesh touch electrode 21 is formed to be separated from the second mesh touch electrode 220.

The first mesh touch electrode 210 and the second supplementary mesh touch electrode 21 are overlapped, and the second mesh touch electrode 220 and the first supplementary mesh touch electrode 22 are overlapped. Also, the second mesh touch electrode 220 and the second supplementary mesh touch electrode 21 are inserted in the contact cutouts 251 and 252 such that the first mesh touch electrode 210 is connected to the second supplementary mesh touch electrode 21 through the contact cutout 251 and the second mesh touch electrode 220 is connected to the first supplementary mesh touch electrode 22 through the contact cutout 252. In this case, the first connection 212 and the second connection 222 are insulated by the insulating layer 250.

Accordingly, the first mesh touch electrode 210 and the second supplementary mesh touch electrode 21 transmit the first touch signal, and the second mesh touch electrode 220 and the first supplementary mesh touch electrode 22 transmit the second touch signal. An electric field E contributing to sense the touch existence is formed between the first mesh touch electrode 210 and the second supplementary mesh touch electrode 21, and the second mesh touch electrode 220 and the first supplementary mesh touch electrode 22.

In this case, the second supplementary mesh touch electrode 21 and the second mesh touch electrode 220 are inserted in the contact cutouts 251 and 252, thereby having a supplementary inner wall 21a and an inner wall 221a positioned at an inner wall of the contact cutouts 251 and 252. The supplementary inner wall 21a and the inner wall 221a respectively have predetermined heights h1 and h2 with a large facing area. Accordingly, the intensity of the electric field E which is formed between the supplementary inner wall 21a and the inner wall 221a may be maximized, thereby improving the sensing sensitivity.

In this exemplary embodiment, the first supplementary mesh touch electrode and the second supplementary mesh touch electrode are formed to increase the intensity of the electric field used for sensing touch existence. However, another exemplary embodiment further forming an additional mesh touch electrode to increase the intensity of the electric field is possible.

Next, a touch sensor and a display device including the same according to another exemplary embodiment of the present disclosure will be described with reference to FIG. 9.

Figure 9:
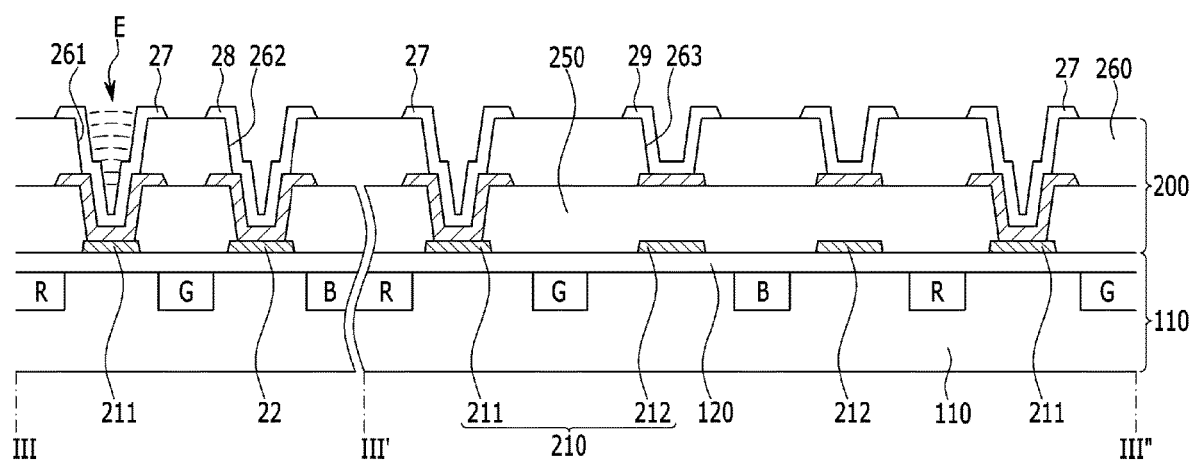
FIG. 9 is a cross-sectional view of a touch sensor and a display device including the same according to another exemplary embodiment of the present disclosure.

FIG. 9 is a cross-sectional view of a touch sensor and a display device including the same according to another exemplary embodiment of the present disclosure.

The exemplary embodiment shown in FIG. 9 is substantially the same as the exemplary embodiment shown in FIG. 1 to FIG. 8 except for an additional mesh touch electrode such that the repeated description is omitted.

As shown in FIG. 9, the touch sensor and the display device including the same according to the current exemplary embodiment of the present disclosure include an additional insulating layer 260 covering the insulating layer 250 and the second mesh touch electrode 220, and the second supplementary mesh touch electrode 21 is formed thereon. The additional insulating layer 260 has additional contact cutouts 261 and 262 exposing the second mesh touch electrode 220 and the second supplementary mesh touch electrode 21.

Additional mesh touch electrodes 27 and 28 are formed on the additional insulating layer 260. The additional mesh touch electrodes 27 and 28 include an additional second mesh touch electrode 27 positioned overlapping the second mesh touch electrode 220 and an additional second supplementary mesh touch electrode 28 positioned overlapping the second supplementary mesh touch electrode 21. Accordingly, the additional second mesh touch electrode 27 is connected to the second mesh touch electrode 220 through the additional contact cutout 261, and the additional second supplementary mesh touch electrode 28 is connected to the second supplementary mesh touch electrode 21 through the additional contact cutout 262.

Accordingly, the first touch signal is transmitted to the first mesh touch electrode 210, the second supplementary mesh touch electrode 21, and the additional second supplementary mesh touch electrode 28, and the second touch signal is transmitted to the first supplementary mesh touch electrode 22, the second mesh touch electrode 220, and the additional second mesh touch electrode 27. Accordingly, the electric field E contributing to sensing touch existence is largely formed such that the intensity of the electric field E is maximized, thereby improving the sensing sensitivity.

In this exemplary embodiment, the contact cutout is a plurality of linear cutouts. However, another exemplary embodiment in which the contact cutout is a plurality of circular cutouts is possible.

Next, a touch sensor and a display device including the same according to another exemplary embodiment of the present disclosure will be described with reference to FIG. 10 to FIG. 13.

Figure 10:
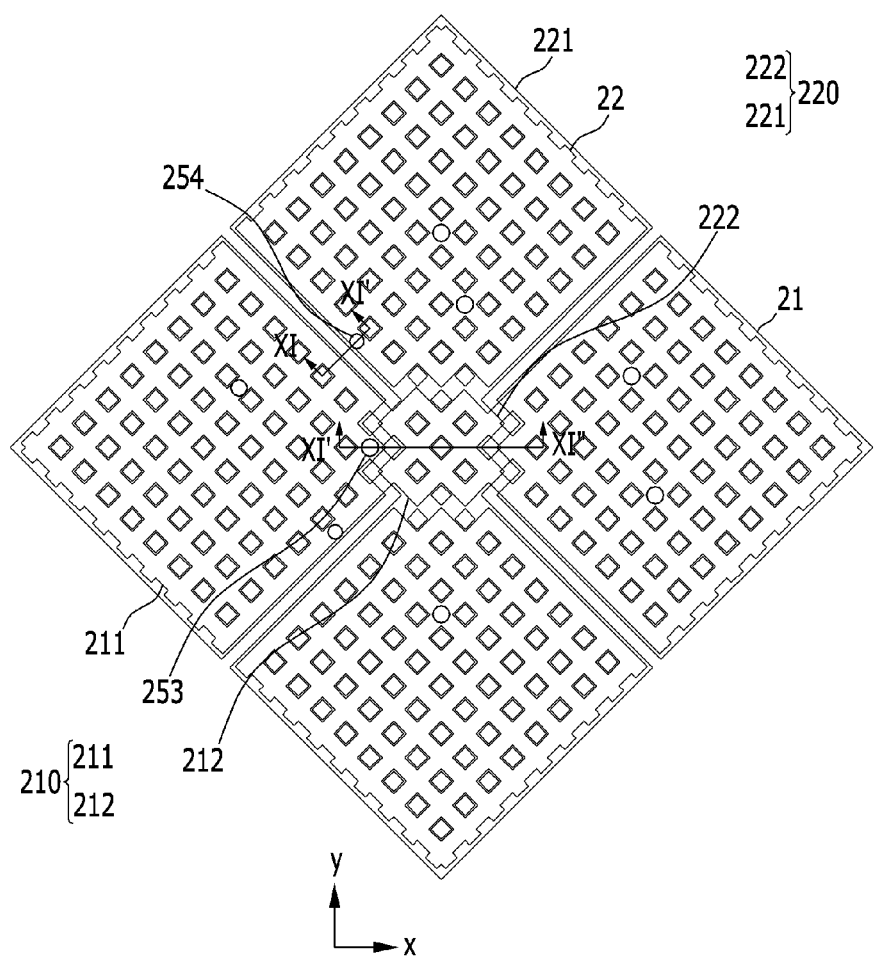
FIG. 10 is an enlarged layout view of a portion of a touch sensor and a display device including the same according to another exemplary embodiment of the present disclosure.
Figure 11:
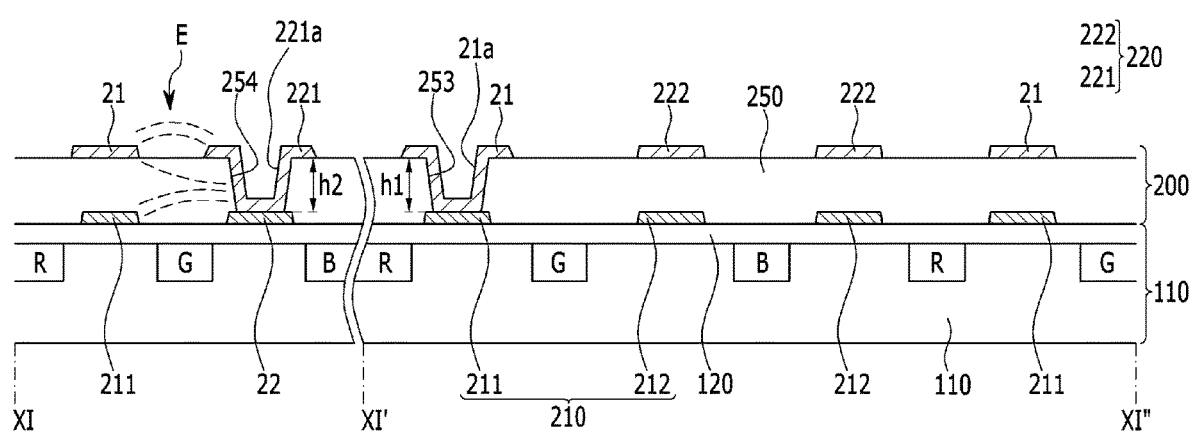
FIG. 11 is a cross-sectional view of the touch sensor and the display device of FIG. 10 taken along lines XI-XI' and XI'-XI".
Figure 12:
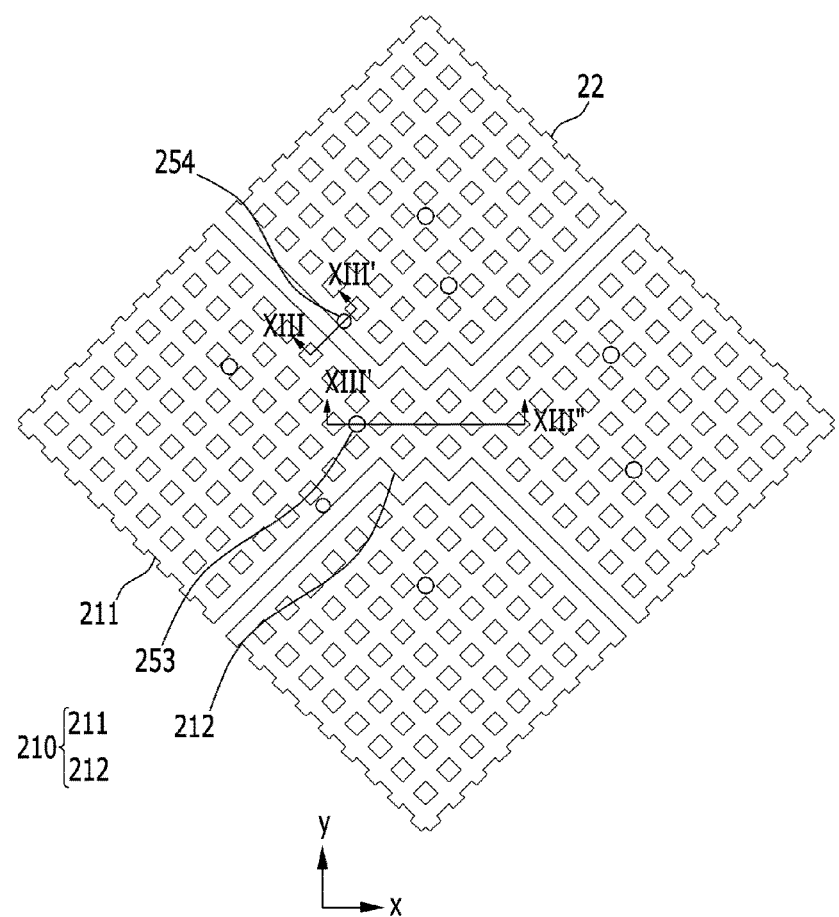
FIG. 12 is a layout view only showing a first mesh touch electrode, a first supplementary mesh touch electrode, and a contact cutout in FIG. 10.
Figure 13:
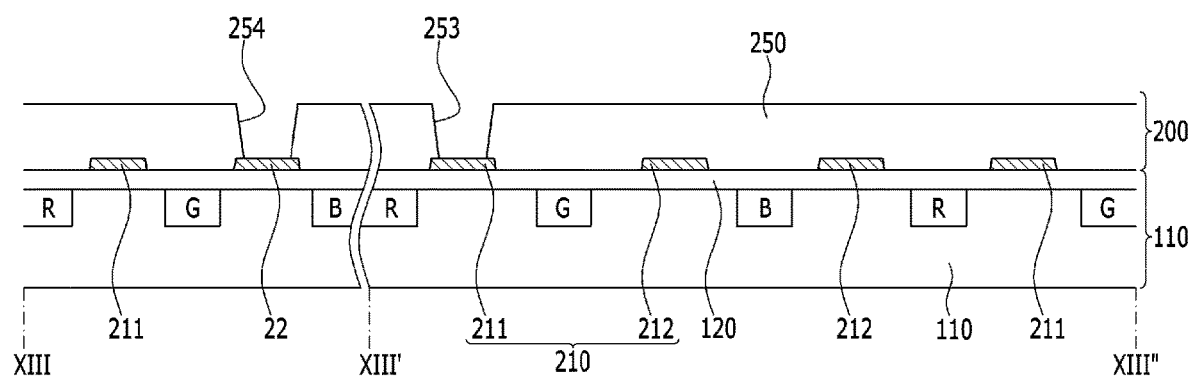
FIG. 13 is a cross-sectional view taken along lines XIII-XIII' and XIII'-XIII" of FIG. 12.

FIG. 10 is an enlarged layout view of a portion of a touch sensor and a display device including the same according to another exemplary embodiment of the present disclosure, FIG. 11 is a cross-sectional view of the touch sensor and the display device of FIG. 10 taken along lines XI-XI' and XI'-XI", FIG. 12 is a layout view only showing a first mesh touch electrode, a first supplementary mesh touch electrode, and a contact cutout in FIG. 10, and FIG. 13 is a cross-sectional view taken along lines XIII-XIII' and XIII'-XIII" of FIG. 12.

The exemplary embodiment shown in FIG. 10 to FIG. 13 is substantially the same as the exemplary embodiment shown in FIG. 1 to FIG. 8 except for the contact cutout including a plurality of circular cutouts.

As shown in FIG. 10 to FIG. 13, in the touch sensor and the display device according to the current exemplary embodiment of the present disclosure, the first mesh touch electrode 210 and the first supplementary mesh touch electrode 22 are formed on the display panel 100. The first mesh touch electrode 210 includes the first main touch unit 211 of an approximate rhomboid shape and the first connection 212 connecting the first main touch unit 211.

The insulating layer 250 covering the first mesh touch electrode 210 and the first supplementary mesh touch electrode 22 is formed thereon. The insulating layer 250 has contact cutouts 253 and 254 respectively exposing the first mesh touch electrode 210 and the first supplementary mesh touch electrode 22.

The contact cutouts 253 and 254 are a plurality of circular cutouts separated from each other, and are positioned corresponding to the first main touch unit 211 and the first supplementary mesh touch electrode 22.

The second mesh touch electrode 220 and the second supplementary mesh touch electrode 21 are formed on the insulating layer 250. The second mesh touch electrode 220 includes the second main touch unit 221 of an approximate rhomboid shape and the second connection 222 connecting the second main touch unit 221.

Since the second supplementary mesh touch electrode 21 and the second mesh touch electrode 220 are respectively inserted in the contact cutouts 253 and 254, the first mesh touch electrode 210 is connected to the second supplementary mesh touch electrode 21 through the contact cutout 253 and the first supplementary mesh touch electrode 22 is connected to the second mesh touch electrode 220 through the contact cutout 254. In this case, the first connection 212 and the second connection 222 are insulated by the insulating layer 250.

Since the second supplementary mesh touch electrode 21 and the second mesh touch electrode 220 are inserted in the contact cutouts 253 and 254, they respectively have the supplementary inner wall 21a and the inner wall 221a positioned at the inner wall of the contact cutouts 253 and 254. The supplementary inner wall 21a and the inner wall 221a respectively have the predetermined heights h1 and h2. Accordingly, the electric field E is largely formed between the second mesh touch electrode 220 adjacent to the second supplementary mesh touch electrode 21 having the supplementary inner wall 21a and the first supplementary mesh touch electrode 22, and the electric field E is also largely formed between the first mesh touch electrode 210 adjacent to the second mesh touch electrode 220 having the inner wall 221*a* and the second supplementary mesh touch electrode 21 such that the intensity of the electric field E is maximized, thereby improving touch sensing sensitivity.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An organic light emitting diode display, comprising:
  a substrate;
  a plurality of transistors disposed on the substrate;
  a plurality of emission units disposed on the substrate and connected to the plurality of transistors;
  a covering layer disposed on the plurality of emission units and the substrate;
  a first mesh touch electrode, which is disposed on the covering layer, extends in a first direction, and transmits a first touch signal;
  a first supplementary mesh touch electrode disposed on the covering layer
  an insulating layer disposed on the first mesh touch electrode and the first supplementary mesh touch electrode, and comprising a first contact cutout and a second contact cutout; and
  a second mesh touch electrode, which is disposed on the covering layer, extends in a second direction crossing the first direction, and transmits a second touch signal;
  a second supplementary mesh touch electrode disposed on the insulating layer;
  an additional insulating layer disposed on the insulating layer, the second mesh touch electrode and the second supplementary mesh touch electrode and comprising a first additional contact cutout; and
  a first additional mesh touch electrode disposed on the additional insulating layer, wherein:
  the second supplementary mesh touch electrode is connected to the first mesh touch electrode through the first contact cutout, and the first additional mesh touch electrode is connected to the second supplementary mesh touch electrode through the first additional contact cutout;
  the second mesh touch electrode is connected to the first supplementary mesh touch electrode through the second contact cutout;
  a lower portion of an extending portion of the first additional mesh touch electrode extends into the second supplementary mesh touch electrode and an upper portion of the extending portion of the first additional mesh touch electrode extends above the second supplementary mesh touch electrode to maximize an electric field contributing to sensing existence of a touch;
  each portion of the first mesh touch electrode and the first supplementary mesh touch electrode is disposed between adjacent emission units of the plurality of emission nits in a plan view; and
  each of the first contact cutout, the second contact cutout, and the first additional contact cutout comprises multiple intersecting linear cutouts connected to each other to form a mesh shape that corresponds to the first main touch unit of the first touch electrode, the first supplementary mesh touch electrode, a second main touch unit of the second mesh touch electrode, the second supplementary mesh touch electrode, and the first additional mesh touch electrode, and are positioned to correspond to the first main touch unit of the first mesh touch electrode and the first supplementary mesh touch electrode.

2. The organic light emitting diode display of claim 1, further comprising a second additional mesh touch electrode disposed on the additional insulating layer,
  wherein the additional insulating layer further comprises a second additional contact cutout, and the second additional mesh touch electrode is connected to the second mesh touch electrode through the second additional contact cutout.

3. The organic light emitting diode display of claim 2, wherein:
  the first supplementary mesh touch electrode is composed of the same material as the first mesh touch electrode; and
  the first supplementary mesh touch electrode is disposed at the same layer as the first mesh touch electrode.

4. The organic light emitting diode display of claim 2, wherein:
  the second supplementary mesh touch electrode is composed of the same material as the second mesh touch electrode; and
  the second supplementary mesh touch electrode is disposed at the same layer as the second mesh touch electrode.

5. The organic light emitting diode display of claim 2, wherein:
  the first additional mesh touch electrode is composed of the same material as the second additional mesh touch electrode; and
  the first additional mesh touch electrode is disposed at the same layer as the second additional mesh touch electrode.

6. The organic light emitting diode display of claim 2, wherein:
  each portion of the second mesh touch electrode and the second supplementary mesh touch electrode is disposed between adjacent emission units of the plurality of emission units in a plan view.

7. The organic light emitting diode display of claim 2, wherein:
  each portion of the first additional mesh touch electrode and the second additional mesh touch electrode is disposed between adjacent emission units of the plurality of emission units in a plan view.

8. The organic light emitting diode display of claim 2, wherein:
  the first contact cutout comprises a plurality of linear cutouts overlapping the first mesh touch electrode and connected to each other to form a mesh shape; and
  the second contact cutout comprises a plurality of linear cutouts overlapping the first supplementary mesh touch electrode and connected to each other to form a mesh shape.

9. The organic light emitting diode display of claim 2, wherein:
  the first additional contact cutout comprises a plurality of linear cutouts overlapping the second supplementary mesh touch electrode and connected to each other to form a mesh shape; and the second additional contact cutout comprises a plurality of linear cutouts overlapping the second mesh touch electrode and connected to each other to form a mesh shape.

10. The organic light emitting diode display of claim 2, wherein:
- the first contact cutout comprises a plurality of circular cutouts overlapping the first mesh touch electrode and separated from each other; and
- the second contact cutout comprises a plurality of circular cutouts overlapping the first supplementary mesh touch electrode and separated from each other.

11. The organic light emitting diode display of claim 2, wherein:
- the first additional contact cutout comprises a plurality of circular cutouts overlapping the second supplementary mesh touch electrode and separated from each other; and
- the second additional contact cutout comprises a plurality of circular cutouts overlapping the second mesh touch electrode and separated from each other.

\* \* \* \* \*